United States Patent
Matsuda

(10) Patent No.: US 9,008,938 B2
(45) Date of Patent: Apr. 14, 2015

(54) CONTROL SYSTEM IN VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 823 days.

(21) Appl. No.: 13/186,349

(22) Filed: Jul. 19, 2011

(65) Prior Publication Data

US 2012/0017871 A1 Jan. 26, 2012

(30) Foreign Application Priority Data

Jul. 20, 2010 (JP) ................................. 2010-162867

(51) Int. Cl.
*F02D 41/00* (2006.01)
*F02D 29/02* (2006.01)
*B60K 28/16* (2006.01)
*F02D 9/02* (2006.01)
*F02D 41/02* (2006.01)
*F02D 41/10* (2006.01)
*F02B 61/02* (2006.01)

(52) U.S. Cl.
CPC ................ *F02D 29/02* (2013.01); *B60K 28/16* (2013.01); *B60W 2300/36* (2013.01); *F02B 61/02* (2013.01); *F02D 9/02* (2013.01); *F02D 41/0205* (2013.01); *F02D 41/022* (2013.01); *F02D 41/10* (2013.01); *F02D 2200/501* (2013.01); *F02D 2200/602* (2013.01); *F02D 2200/702* (2013.01)

(58) Field of Classification Search
USPC ...................................................... 701/82, 84
See application file for complete search history.

(56) References Cited

U.S. PATENT DOCUMENTS

| | | | |
|---|---|---|---|
| 7,315,774 B2 | 1/2008 | Morris | |
| 7,386,381 B2 | 6/2008 | Matsushima et al. | |
| 7,577,507 B2 | 8/2009 | Morris | |
| 8,046,142 B2 | 10/2011 | Morris et al. | |
| 8,359,144 B2 | 1/2013 | Morris et al. | |
| 2008/0182716 A1 | 7/2008 | Sato et al. | |
| 2010/0324788 A1* | 12/2010 | Toda | ............................... 701/50 |
| 2011/0130932 A1 | 6/2011 | Takenaka et al. | |

FOREIGN PATENT DOCUMENTS

JP 2000170566 A 6/2000
JP 2001115870 A 4/2001

(Continued)

OTHER PUBLICATIONS

Matsuda, Yoshimoto, U.S. Appl. No. 13/186,367, filed Jul. 19, 2011, 48 pages.

*Primary Examiner* — Derek D Knight
(74) *Attorney, Agent, or Firm* — Alleman Hall McCoy Russell & Tuttle LLP

(57) ABSTRACT

A control system for controlling a driving power source in a vehicle, includes a driving state detector for detecting a driving state of the vehicle; a first determiner for determining whether or not the driving state detected by the driving state detector is a first state; a second determiner for determining whether or not the driving state detected by the driving state detector is a second state; a rotational speed limiter for executing rotational speed limiting control for limiting a driving power source rotational speed to a predetermined upper limit value or less when the first determiner determines that the driving state is the first state, during an operation of the driving power source; and a rotational speed limiting termination unit for terminating the rotational speed limiting control, when the second determiner determines that the driving state is the second state, during the operation of the driving power source.

12 Claims, 7 Drawing Sheets

(56) References Cited

FOREIGN PATENT DOCUMENTS

| | | |
|---|---|---|
| JP | 2003237422 A | 8/2003 |
| JP | 2005-321088 A | 11/2005 |
| JP | 2006-329118 A | 12/2006 |
| JP | 2009-108886 A | 5/2009 |
| JP | 2010031849 A | 2/2010 |
| JP | 2011-111133 A | 6/2011 |

* cited by examiner

CONTROL SYSTEM IN VEHICLE

CROSS-REFERENCE TO RELATED APPLICATION

The present application claims priority to and the benefit of Japanese Patent Application No. 2010-162867 filed on Jul. 20, 2010, which is hereby incorporated by reference in its entirety for all purposes.

BACKGROUND ART

1. Field of the Invention

The present invention generally relates to control systems in vehicles such as motorcycles, ATVs (all terrain vehicles), or small trucks. More particularly, the present invention relates to control of driving power sources to improve drivers' feeling during, for example, starting of the vehicles.

2. Description of the Related Art

In general, a vehicle drives on a bad road surface or rough road surface of a gravel road, a muddy road, a sandy road, etc., as well as a good road surface of a dried pavement, etc. During driving on the bad road surface, a wheel's (or tire's) grip force on the road surface tends to be small. If an engine speed increases in excess during starting, the drive wheel slips, and an impact is transmitted to a driver at a time point when the drive wheel's grip force on the road surface is restored after the slip is mitigated. This may result in a situation where the vehicle cannot start smoothly.

In addition to the above case, if a clutch is operated unskillfully by a driver in a relatively high engine speed condition during driving at a low speed, a driving power transmitted to the wheel changes rapidly, and the resulting impact is transmitted to the driver. Besides, due to such a rapid change in the driving power, the drive wheel slips for a moment and the resulting impact is transmitted to the driver as in the above case. Under such a high engine speed condition, the vehicle cannot start and accelerate smoothly.

Under the circumstances, to suppress a drive wheel slip, traction control is used, in which a slip state of the drive wheel is detected based on a signal from a rotational speed sensor attached on the drive wheel and an engine torque is reduced as necessary based on the detected slip state. The slip of the drive wheel can be suppressed by reducing the engine torque.

Japanese Laid-Open Patent Application Publication No. 2006-329118 discloses a leisure vehicle in which a rotational speed of a front wheel which is a driven wheel is assumed as a vehicle speed and an engine speed is controlled to be a predetermined engine speed (e.g., about 700 rpm) irrespective of the driver's accelerator operation, when this vehicle speed is zero, a transmission gear position is a first gear position, and the engine speed is greater than or equal to a predetermined value, i.e., during starting of the vehicle, thereby enabling the vehicle to start smoothly even on the bad road surface.

However, in the conventional traction control generally used, it is necessary to perform feed-back control of the output of the engine speed sensor, and such control is complex. After the traction control is initiated, an engine torque continues to be suppressed irrespective of the driver's accelerator operation, during a period of time until the slip of the drive wheel finishes and the traction control is terminated. During the period of time, the driver's operation of an accelerator or the like is not reflected by the vehicle's behavior. In addition, in the traction control, since the engine torque is reduced after the slip of the drive wheel has occurred, the impact cannot be mitigated sufficiently sometimes, which leaves room for improvement.

In the case where the engine speed is controlled irrespective of the driver's accelerator operation during starting, as disclosed in Japanese Laid-Open Patent Application Publication No. 2006-329118, the driver feels discomfort because the accelerator operation is not reflected well by the vehicle's behavior. In the conventional example, since the engine speed is set considerably low to enable the vehicle to start smoothly even on the bad road surface or the like, the driver feels that the engine speed does not substantially increase regardless of the driver's operation of the accelerator or the like, and an engine stall could occur if the clutch is operated unskillfully by the driver.

SUMMARY OF THE INVENTION

The present invention addresses the above described condition, and an object of the present invention is to reflect a driver's operation of an accelerator or the like, on control of a driving power source to a great extent, while preventing the rotational speed of the driving power source from increasing in excess according to a driving state of a vehicle, and implementing smooth starting and acceleration, by using simplified control.

According to the present invention, a control system for controlling a driving power source in a vehicle, comprises a driving state detector for detecting a driving state of the vehicle; a first determiner for determining whether or not the driving state detected by the driving state detector is a first state; a second determiner for determining whether or not the driving state detected by the driving state detector is a second state; a rotational speed limiter for executing rotational speed limiting control for limiting a rotational speed of the driving power source to a value which is less than or equal to a predetermined upper limit value when the first determiner determines that the driving state is the first state, during an operation of the driving power source; and a rotational speed limiting termination unit for terminating the rotational speed limiting control, when the second determiner determines that the driving state is the second state, during the operation of the driving power source.

In accordance with this configuration, in the state where the driving state of the vehicle is the first state, the rotational speed limiting control is performed to suppress an increase in the rotational speed of the driving power source. That is, it is possible to prevent the rotational speed of the driving power source from increasing in excess, thereby suppressing a slip in a drive wheel, during, for example, starting or accelerated driving of the vehicle. In this case, the rotational speed of the driving power source is merely limited to a value which is less than or equal to the upper limit value, and in a rotational speed range lower than the upper limit value, the rotational speed of the driving power source changes according to the driver's operation of an accelerator or the like.

Since the rotational speed limiting control is to merely limit the rotational speed of the driving power source to a value which is less than or equal to the upper limit value, it is implemented in a simple and easy way. When the driving state of the vehicle has shifted from the first state to the second state, the rotational speed limiting control is terminated, and the rotational speed of the driving power source increases and exceeds the above upper limit value according to the driver's operation of the accelerator or the like.

In brief, since the rotational speed limiting control is executed and terminated according to the driving state of the vehicle, it is possible to prevent the rotational speed of the driving power source from increasing in excess as necessary and implement smooth driving of the vehicle during starting, acceleration, or the like. In addition, the driver's operation of the accelerator or the like is reflected to a great extent on the control of the driving power source.

The first state may include a state where a first condition in which the vehicle is in a stopped state or a driver has performed an operation for stopping the vehicle, is met. This is because, when the first condition is met, the vehicle is predicted to start or be accelerated soon.

The driving state detector may include at least one of a vehicle speed sensor for detecting a vehicle speed, an accelerator operation amount sensor for detecting an amount of operation of an accelerator performed by the driver, and a brake pressure sensor for detecting a brake pressure; and the first condition may include at least one of a condition in which the vehicle speed detected by the vehicle speed sensor is less than or equal to a set threshold, a condition in which the amount of operation of the accelerator detected by the accelerator operation amount sensor is less than or equal to a set threshold, and a condition in which the brake pressure detected by the brake pressure sensor is greater than or equal to a set threshold.

Preferably, the first state may further include a state where a second condition in which the driver has performed an operation for starting or accelerating the vehicle is met after the first condition is met. This allows the rotational speed limiting control to be performed more surely during starting or acceleration of the vehicle.

The driving state detector may further include a clutch operation sensor for detecting an operation of a clutch performed by the driver; and the second condition may include at least one of a condition in which the amount of operation of the accelerator detected by the accelerator operation amount sensor is greater than or equal to a set threshold, and a condition in which the operation of the clutch is detected by the clutch operation sensor.

The driving state detector may include an accelerator operation amount sensor for detecting an amount of operation of an accelerator performed by the driver and a clutch operation sensor for detecting an operation of a clutch performed by the driver; and the first state may include a state where a condition in which the amount of operation of the accelerator detected by the accelerator operation amount sensor is greater than or equal to a set threshold, and a condition in which the operation of the clutch is detected by the clutch operation sensor, are met.

When the accelerator is operated by the driver while the clutch is operated by the driver, it may be determined that the vehicle is starting or is shifting to accelerated driving after the gear position is changed.

The driving state detector may further include a driving power source rotational speed sensor for detecting the rotational speed of the driving power source, an accelerator operation amount sensor for detecting an amount of operation of an accelerator performed by the driver, and a vehicle speed sensor for detecting a vehicle speed; and the second state may include a state where at least one of a condition in which the rotational speed of the driving power source detected by the driving power source rotational speed sensor has decreased from a value which is greater than or equal to a set threshold to a value less than the set threshold, a condition in which the amount of operation of the accelerator detected by the accelerator operation amount sensor has decreased from a value which is greater than or equal to a set threshold to a value less than the set threshold, a condition in which the vehicle speed detected by the vehicle speed sensor is greater than or equal to a set threshold, and a gear position in a transmission is higher than or equal to a set gear position, is met.

When the vehicle speed becomes relatively higher and the transmission gear position is upshifted, it is determined that the vehicle has shifted from the starting state to the normal driving state, and the rotational speed limiting control is terminated. This allows the rotational speed of the driving power source to change according to the driver's accelerator operation. On the other hand, when the operation amount of the accelerator reduces, or the rotational speed of the driving power source decreases, in the middle of the starting or the acceleration, it is determined that starting or the acceleration is halted for some reason or other, and the rotational speed limiting control is terminated.

The rotational speed limiter reduces a torque of the driving power source according to a magnitude of a rotational speed deviation with respect to the upper limit value when the rotational speed of the driving power source exceeds the upper limit value. This makes it possible to decrease the engine speed to the upper limit value quickly.

The upper limit value of the rotational speed of the driving power source in the rotational speed limiting control may be set to increase according to a vehicle speed. This allows the engine speed to increase gradually as the vehicle speed increases gradually from zero during starting of the vehicle. This provides the driver a comfortable driving feeling.

The control system may further comprise a torque controller for controlling a torque of the driving power source according to at least one of a slip state of the drive wheel and a change state of the rotational speed of the driving power source, to execute general traction control, along with the rotational speed limiting control. This allows the drive wheel to be prevented from slipping to a great degree more surely.

The control system may further comprise a select switch which is turned ON or OFF to permit or inhibit execution of the rotational speed limiting control; and a signal from the select switch may be accepted by the rotational speed limiter when at least one of a plurality of conditions is met, the conditions being a condition in which a clutch is operated by the driver, a condition in which an amount of an operation of an accelerator performed by the driver is less than or equal to a predetermined value and the accelerator is in a substantially fully closed position, a condition in which a vehicle speed is less than or equal to a predetermined value and the vehicle is in a stopped state, a condition in which a brake pressure is higher than or equal to a predetermined value and a brake is actuated, and a condition in which a gear position in a transmission is a neutral position.

This is because, in some occasions, the driver driving a leisure vehicle, etc., intentionally wishes to enjoy driving on a bad road surface condition. In these occasions, the driver does not care about some impact but wishes the engine to spin up linearly in response to the driver's accelerator operation.

Nonetheless, if the control is switched during driving of the vehicle in response to the operation of the select switch, and the driving power transmitted to the drive wheel changes rapidly, this is undesirable. For example, during accelerated driving of the vehicle, if the rotational speed limiting control is terminated in a state where the rotational speed of the driving power source is limited to a value which is less than or equal to the upper limit value by the rotational speed limiting control, the rotational speed of the driving power source increases rapidly, which makes the driver feel discomfort.

In light of this, a signal from the select switch may be accepted by the rotational speed limiter when at least one of a plurality of conditions is met, the conditions being a condition in which a clutch is operated by the driver, a condition in which an amount of an operation of an accelerator performed by the driver is less than or equal to a predetermined value and the accelerator is in a substantially fully closed position, a condition in which a vehicle speed is less than or equal to a predetermined value and the vehicle is in a stopped state, a condition in which a brake pressure is higher than or equal to a predetermined value and a brake is actuated, and a condition in which a gear position in a transmission is a neutral position. The control system may further comprise an over Rev limiter for limiting the rotational speed of the driving power source to a value which is less than or equal to a value of an over speed during an operation of the driving power source to protect the driving power source; and the upper limit value in the rotational speed limiting control may be set to a value lower than the value of the over speed.

It should be noted that if the upper limit value of the rotational speed of the driving power source in the rotational speed limiting control is set too low, the driver feels that the rotational speed of the driving power source increases with low responsiveness to the driver's operation of the accelerator or the like, when the vehicle is starting on the good road surface, and it is therefore preferred that the upper limit value is set relatively higher. Even in that case, the upper limit value is lower than a rotational upper limit value (over speed) of a general over Rev limiter which is set to protect the driving power source.

The above and further objects, features and advantages of the invention will more fully be apparent from the following detailed description with reference to the accompanying drawings.

DETAILED DESCRIPTION OF THE PREFERRED EMBODIMENTS

Hereinafter, embodiments of the present invention will be described with reference to the drawings. The stated directions are referenced from the perspective of a driver straddling a motorcycle, unless otherwise explicitly noted.

Embodiment 1

Figure 1:
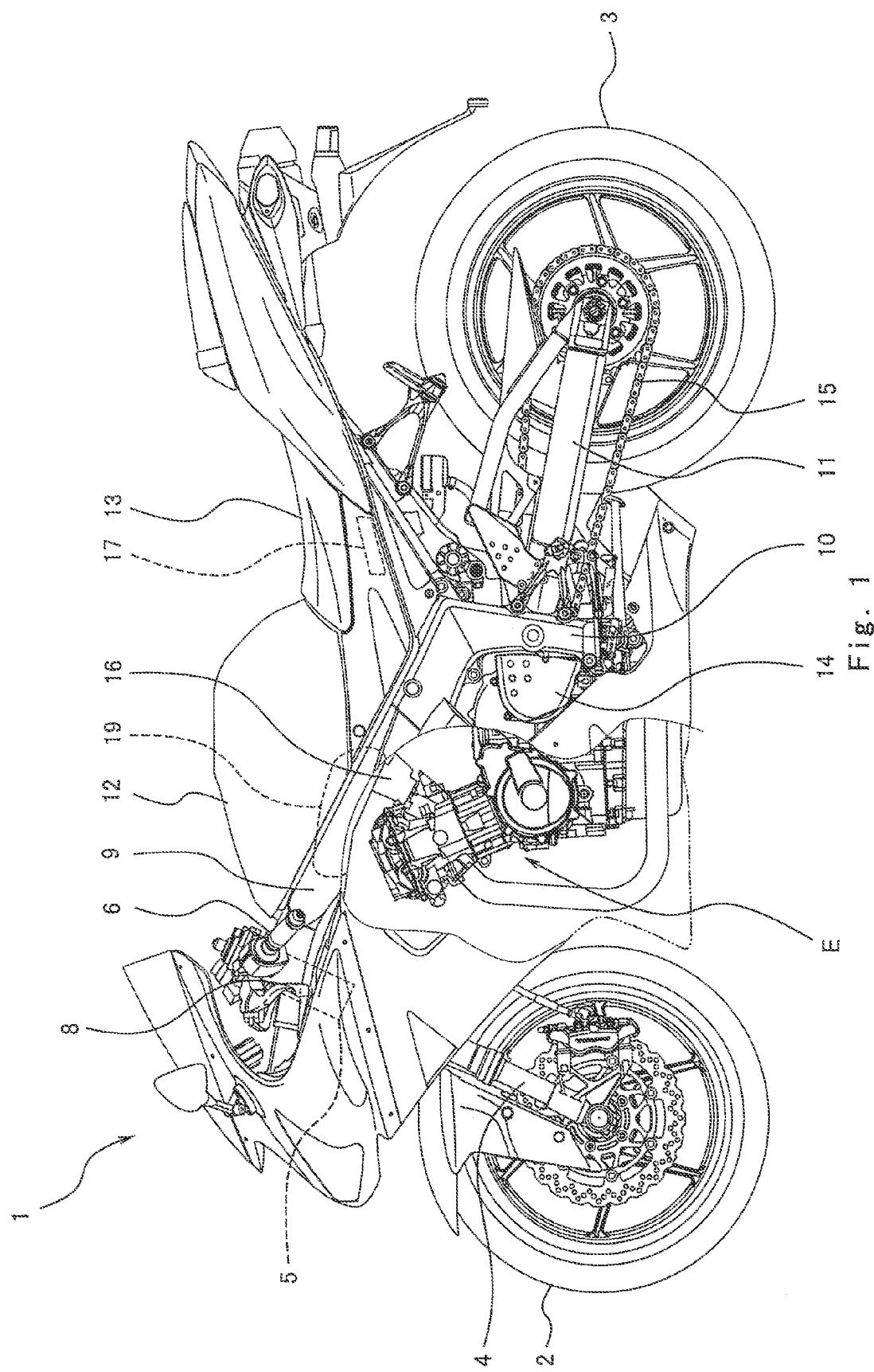
FIG. 1 is a left side view of a motorcycle according to an embodiment of the present invention.

FIG. 1 is a left side view of a motorcycle 1 (vehicle) according to Embodiment 1 of the present invention. Referring now to FIG. 1, the motorcycle 1 includes a front wheel 2 which is a driven wheel and a rear wheel 3 which is a drive wheel. The front wheel 2 is rotatably mounted to the lower end portion of a front fork 4 extending substantially vertically. The front fork 4 is attached to a steering shaft (not shown) via brackets. The steering shaft is rotatably supported by a head pipe 5 provided at a vehicle body of the motorcycle 1.

A bar-type steering handle 6 extending in a rightward and leftward direction is attached to the brackets. The driver maneuvers the steering handle 6 to steer the front fork 4 and the front wheel 2. A throttle grip 7 (see FIG. 3) is provided at a right end portion of the steering handle 6 which is gripped by the driver's right hand. The throttle grip 7 is rotated by twisting the driver's wrist to operate a throttle device 16 as described later. A clutch lever 8 is provided in front of a grip provided at a left end portion of the steering handle 6 gripped by the driver's left hand.

A pair of right and left main frame members 9 extend rearward to be slightly tilted in a downward direction from the head pipe 5. A pair of right and left pivot frame members 10 are coupled to the rear portions of the main frame members 9, respectively. The front end portions of swing arms 11 extending substantially in the longitudinal direction of the motorcycle 1 are coupled to the pivot frame members 10, respectively such that each swing arm 11 is pivotable around the front end portion. The rear wheel 3 is rotatably mounted to the rear end portion of the swing arm 11. A fuel tank 12 is provided behind the steering handle 6. A seat 13 straddled by the driver is provided behind the fuel tank 12.

An engine E (driving power source) including a plurality of cylinders is mounted to the main frame members 9 and to the pivot frame members 10, between the front wheel 2 and the rear wheel 3. A transmission 14 is coupled to the engine E. A driving power generated in the engine E is speed-changed by the transmission 14 and transmitted to the rear wheel 3 via a chain 15. The throttle device 16 is coupled to intake ports (not shown) of the engine E. An air cleaner 19 is disposed below the fuel tank 12 and coupled to the upstream portion of the throttle device 16 in an air flow direction. In an inner space below the seat 13, an ECU 17 (electronic control unit) configured to control a sub-throttle valve 43 (FIG. 3), an injector 48 (FIG. 4), an ignition device 49 (FIG. 4), etc, is accommodated.

Figure 2:
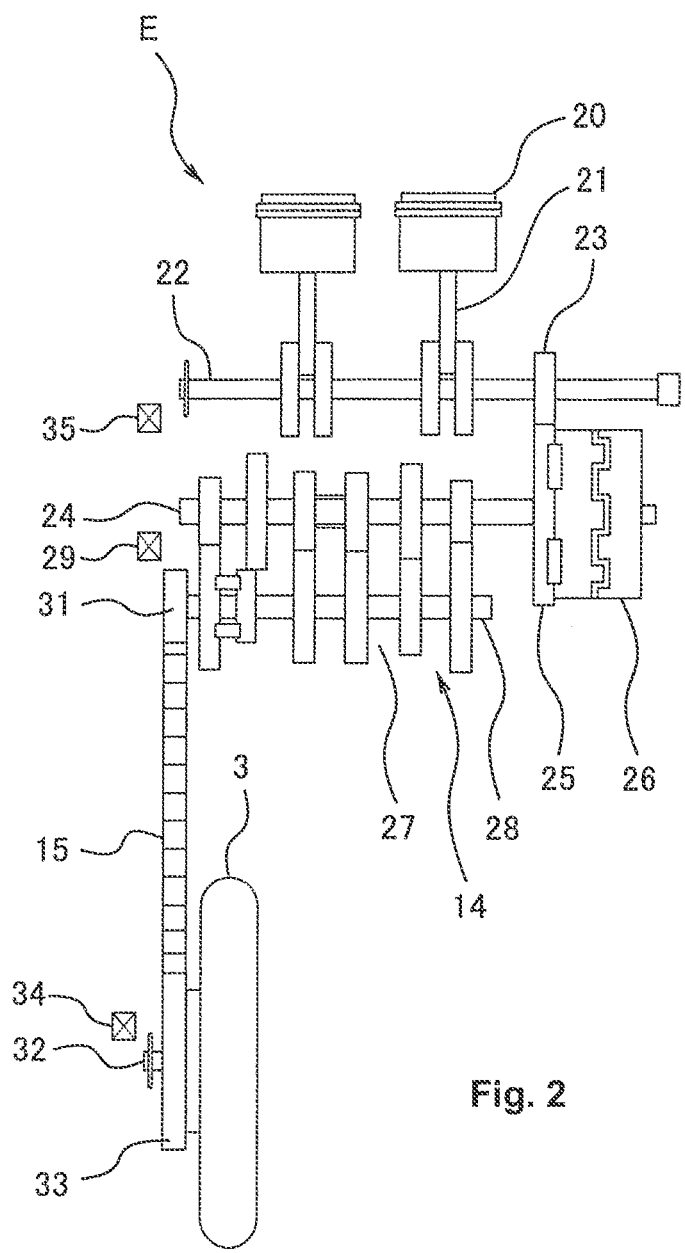
FIG. 2 is a schematic view mainly showing a driving system of the motorcycle of FIG. 1.

FIG. 2 is a schematic view mainly showing a driving system of the motorcycle of FIG. 1. As shown in FIG. 2, the engine E is provided with a crankshaft 22 coupled to pistons 20 thereof via connecting rods 21. A first clutch gear 23 is mounted on the end portion of the crankshaft 22. A second clutch gear 25 is rotatably externally fitted to an input shaft 24 of the transmission 14 and configured to mesh with the first clutch gear 23. A main clutch 26 is mounted on the end portion of the input shaft 24 and is engaged/disengaged to provide connection/disconnection between the second clutch gear 25 and the input shaft 24.

With the input shaft 24 being coupled to the second clutch gear 25 via the main clutch 26, the input shaft 24 is rotatable in association with the crankshaft 22, thereby allowing the engine driving power to be transmitted from the engine E to the transmission 14. An output shaft 28 is coupled to the input shaft 24 via a gear train 27 and arranged in parallel with the input shaft 24 such that the rotational speed of the input shaft 24 is changed by the gear train 27 and transmitted to the output shaft 28. By changing a combination of gears in mesh in the gear train 27 (i.e., gear change), a change gear ratio between the rotational speed of the input shaft 24 and the rotational speed of the output shaft 28, i.e., a gear position of the transmission 14 is changed. The gear position is detected by a gear position sensor 29.

A drive sprocket 31 is mounted on the end portion of the output shaft 28 which outputs the speed-changed rotation. A driven sprocket 33 is mounted on an axle 32 of the rear wheel 3. A chain 15 is installed around the drive sprocket 31 and the driven sprocket 33. A rear wheel speed sensor 34 for detecting the rotational speed of the rear wheel 3 is attached on the swing arm 11 (see FIG. 1). A front wheel speed sensor 36 (see FIG. 3) for detecting the rotational speed of the front wheel 2 which is the driven wheel is provided. In FIG. 2, 35 designates an engine speed sensor for detecting the rotational speed of the crankshaft 22.

Figure 3:
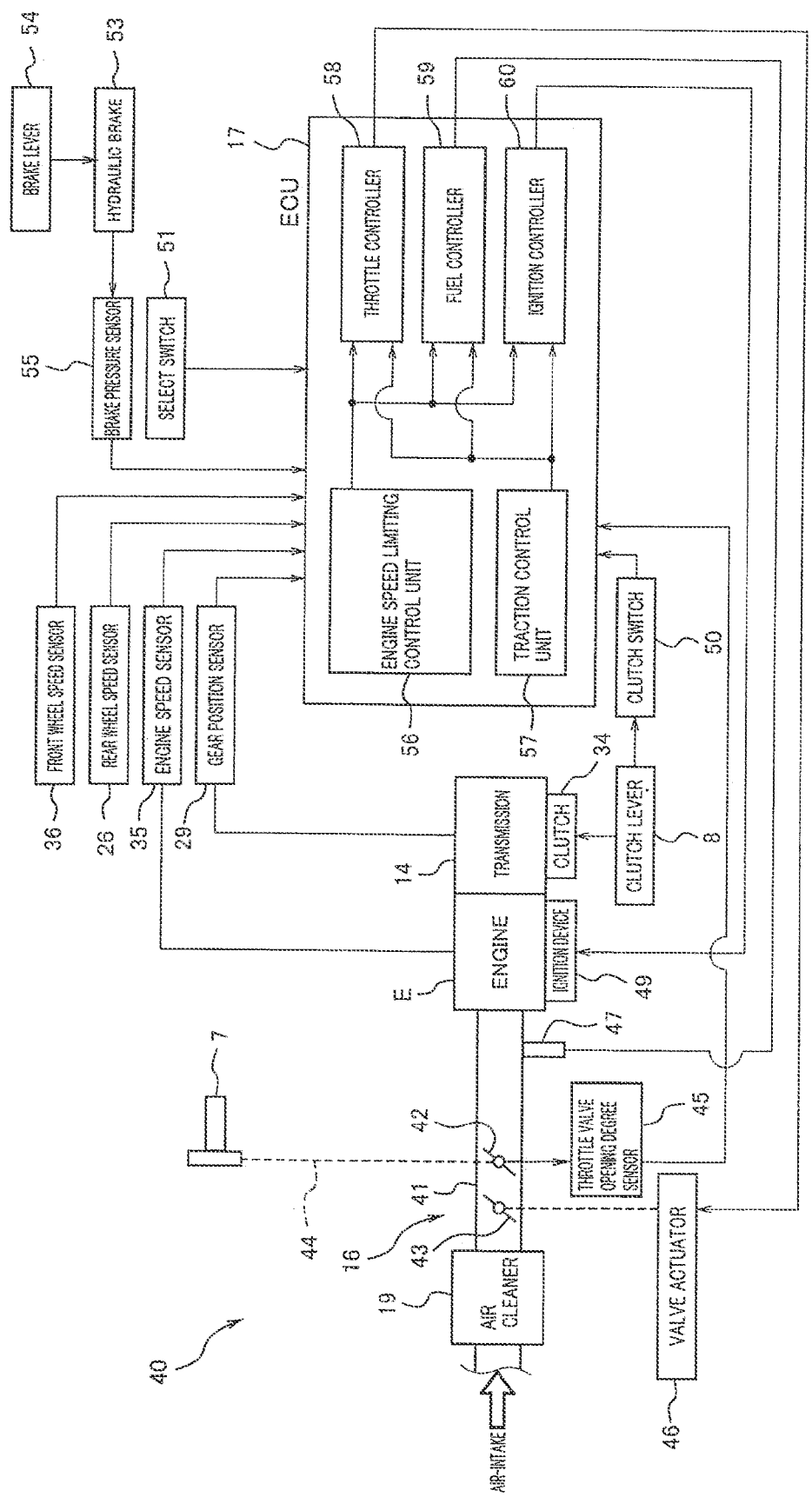
FIG. 3 is a block diagram showing an overall vehicle control system built into the motorcycle.

FIG. 3 is a block diagram showing an overall vehicle control system 40 built into the motorcycle 1 of FIG. 1. Referring to FIG. 3, the vehicle control system 40 includes the throttle device 16 provided between the air cleaner 19 and the engine E. The throttle device 16 includes an air-intake pipe 41, a main throttle valve 42 positioned at a downstream side in an air flow direction in the air-intake pipe 41 and a sub-throttle valve 43 positioned at an upstream side of the main throttle valve 42 in the air-intake pipe 41. The main throttle valve 42 and the sub-throttle valve 43 are opened/closed to control the flow rate of air flowing in the air-intake pipe 41.

The main throttle valve 42 is coupled to the throttle grip 7 via a throttle wire 44. The main throttle valve 42 is opened and closed by the driver's operation of the throttle grip 7. The main throttle valve 42 is provided with a throttle valve opening degree sensor 45 for detecting a valve position (opening degree) of the main throttle valve 42. The throttle valve opening degree sensor 45 constitutes an accelerator operation amount sensor for detecting the operation amount (accelerator operation amount) of the throttle grip 7 with which the main throttle valve 42 is mechanically operative. The sub-throttle valve 43 is coupled to a valve actuator 46 including an electric motor, and is actuated by the valve actuator 46 to be opened and closed.

Although not shown, an air-intake pressure sensor is attached on the air-intake pipe 41 to detect the flow rate of intake-air controlled by the main throttle valve 42 and the sub-throttle valve 43. A plurality of air-intake pipes 41 are provided in the throttle device 16 to respectively correspond to a plurality of cylinders of the engine E. A plurality of injectors 48 are provided to respectively correspond to the plurality of air-intake pipes 41 to individually inject a fuel to them.

The engine E is provided with a plurality of ignition devices 49 for igniting an air-fuel mixture within the plurality of cylinders, respectively. Although not shown specifically, each ignition device 49 includes an ignition plug having an electrode at a tip end facing the inside of the corresponding one of the plurality of cylinders, and an ignition circuit for feeding electric power to the ignition plug in each cylinder at a predetermined timing synchronously with the revolution of the engine E. The amount of the electric power fed from the ignition circuit to the ignition plug in each cylinder is controlled by the ECU 17.

A clutch lever 8 (see FIGS. 1 and 3) is coupled to the main clutch 26 between the engine E and the transmission 14 via a wire, or the like. When the clutch lever 8 is gripped by the driver, the main clutch 26 is disengaged to inhibit the driving power from being transmitted from the engine E to the transmission 14, whereas when the clutch lever 8 is released by the driver, the main clutch 26 permits the driving power to be transmitted. The clutch lever 8 is provided with a clutch switch 50 (clutch operation sensor) for detecting whether or not the clutch lever 8 has been gripped by the driver.

A select switch 51 is provided at the left side of the steering handle 6, like the clutch lever 8. The driver manually turns ON/OFF the select switch 51 to enable/disenable engine speed limiting control (rotational speed limiting control) as described later. In a state where the select switch 51 is ON, the engine speed limiting control is permitted (enabled), whereas in a state where the select switch 51 is OFF, the engine speed limiting control is inhibited (disenabled). The position of the select switch 51 is not limited to the above position so long as the driver operates the select switch 51 easily and correctly.

In the present embodiment, like the above clutch operation, the operated state of a hydraulic brake 53 of the motorcycle 1 can be detected. The hydraulic brake 53 includes a master cylinder for generating a hydraulic power (oil pressure force) according to the driver's operation of the brake lever 54, or the like and a wheel cylinder which receives the hydraulic power and operates to apply a brake force to the front wheel 2 and the rear wheel 3 via brake calipers, respectively. A brake pressure sensor 55 is provided in a brake hydraulic circuit coupling the master cylinder to the brake cylinder to detect a hydraulic power (brake pressure).

The gear position sensor 29, the rear wheel speed sensor 34, the engine speed sensor 35, the front wheel speed sensor 36, the throttle valve opening degree sensor 45, the clutch switch 50, the select switch 51 and the brake pressure sensor 55 are respectively coupled to the ECU 17. In this example, the ECU 17 includes an engine speed limiting control unit 56, a traction control unit 57, a throttle controller 58, a fuel controller 59 and an ignition controller 60.

As will be described later in detail, the engine speed limiting control unit 56 performs calculation as necessary to suppress an increase in the engine speed as described below in detail based on the signals received from the sensors 29, 34-36, 45 and 55 and the switches 50 and 51. The traction control unit 57 is a torque controller for controlling an engine torque based on a slip state of the rear wheel 3, etc., and performs calculation for the traction control conventionally known. Based on a result of the calculation performed by the engine speed limiting control unit 56 and a result of the calculation performed by the traction control unit 57, the throttle controller 58 actuates the valve actuator 46 to control the opening degree of the sub-throttle valve 43. Likewise, the fuel controller 59 controls the injector 48 and the ignition controller 60 controls the ignition device 49.

Basically, the control system 40 of the present embodiment is configured to suppress an increase in the engine speed according to a driving state during starting of the motorcycle 1, etc., or finish suppressing of the increase in the engine speed, to implement smooth starting while suppressing a slip of the rear wheel 3, and to reflect the driver's operation of the accelerator or the like, on the engine control and hence the behavior of the motorcycle 1. The detailed content of this control will be described hereinafter.

Figure 4:
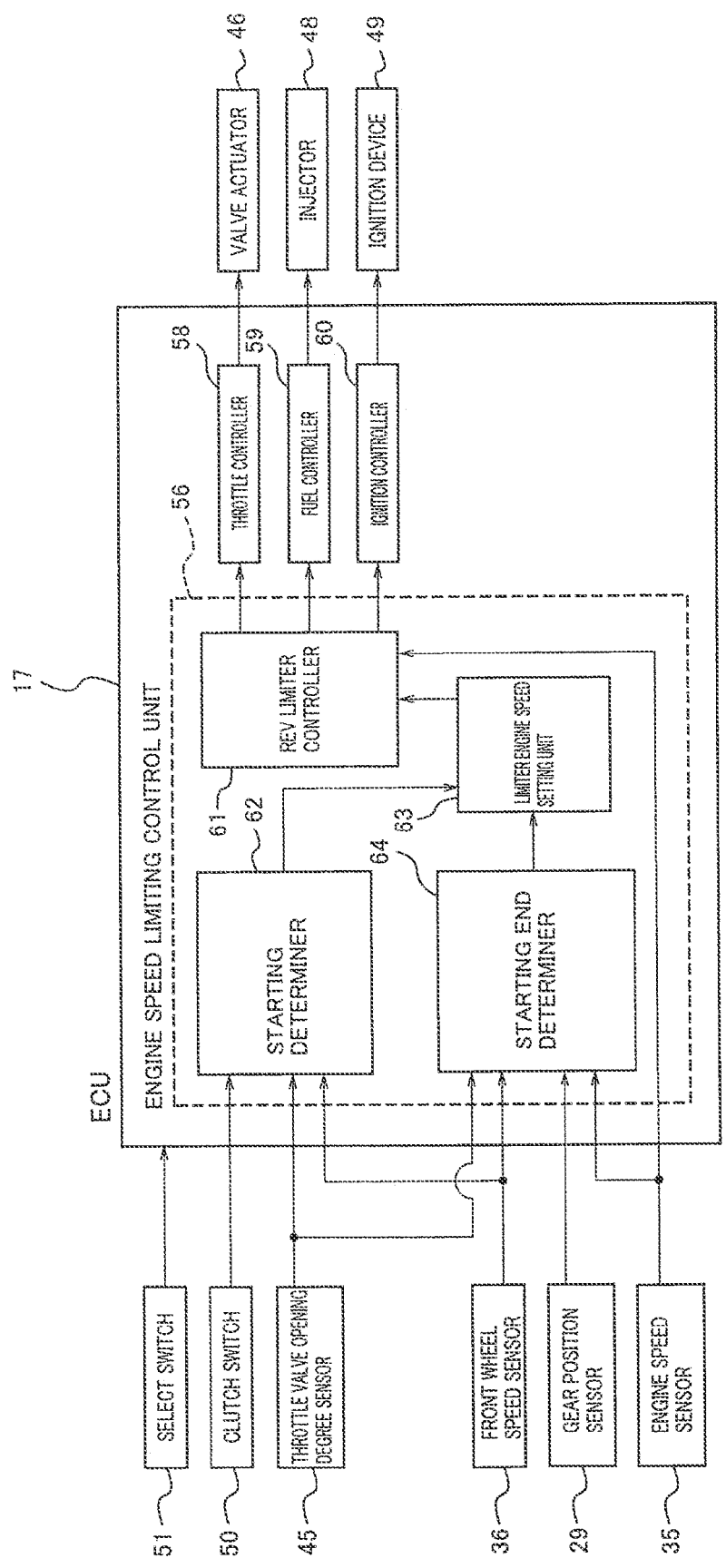
FIG. 4 is a block diagram showing major components in the vehicle control system of FIG. 3.

FIG. 4 is a block diagram showing major components in the control system 40. Referring to FIG. 4, the engine speed limiting control unit 56 in the ECU 17 includes a Rev limiter controller 61 for limiting the engine speed to a value less than or equal to a predetermined upper limit value, a starting determiner 62 (first determiner) for determining whether or not the motorcycle 1 is starting, and a limiter engine speed setting unit 63 for changing the upper limit value of the engine speed in the Rev limiter controller 61 from a normal proper value used for preventing excess revolution to a proper value used for starting the motorcycle 1 smoothly, according to a result of the determination performed by the starting determiner 62.

As well known, the Rev limiter controller 61 is configured to limit the engine speed to a value which is less than or equal to a value of an over speed (normally, set to about 8000~10000 rpm so as not to damage the engine E) to protect the engine E during running of the engine E. The Rev limiter controller 61 performs ignition control or air-intake control as desired to reduce a torque based on the engine speed detected by the engine speed sensor 35.

The starting determiner 62 determines whether or not the motorcycle 1 is starting, based on the signal from the front wheel speed sensor 36 operative as a vehicle speed sensor, the signal from the throttle valve opening degree sensor 45, the signal from the clutch switch 50, etc. Based on a result of this determination, the limiter engine speed setting unit 63 decreases the upper limit value of the engine speed in the Rev limiter controller 61 to, for example, about 3000~5000 rpm. This value allows the motorcycle 1 to start on a dried pavement without occurrence of a great slip in the rear wheel 3.

The engine speed limiting control unit 56 further includes a starting end determiner 64 (second determiner) for determining whether or not starting of the motorcycle 1 has ended, i.e., the motorcycle 1 has shifted from a starting state to a normal driving state, based on the signals from the engine speed sensor 35, the front wheel speed sensor 36, the throttle valve opening degree sensor 45, etc. According to a result of the determination performed by the starting end determiner 64, the limiter engine speed setting unit 63 returns the upper limit value of the engine speed in the Rev limiter controller 61 to an initial value (over speed of the engine E). In other words, the limiter engine speed setting unit 63 serves as an engine speed limiter for performing the engine speed limiting control during starting of the motorcycle 1 and an engine speed limiting termination unit for terminating the engine speed limiting control upon the starting of the motorcycle 1 being accomplished.

In the present embodiment, a signal from the select switch 51 is input to the ECU 17. This signal is accepted by the engine speed limiting control unit 56 only in a predetermined situation. For example, the signal is not accepted by the engine speed limiting control unit 56 in a situation in which the behavior of the motorcycle 1 changes by the execution/non-execution of the engine speed limiting control, for example, when the engine speed limiting control is being executed.

Although not shown in FIG. 4, the traction control unit 57 receives as inputs the signals from the rear wheel speed sensor 34, the engine speed sensor 35, the front wheel speed sensor 36, etc., to determine whether or not a monitored value (e.g., slip ratio of the rear wheel 3 which is derived by subtracting the front wheel speed from the rear wheel speed, or an engine speed change rate) for the traction control is greater than a predetermined value. If the monitored value exceeds this threshold and the degree to which the rear wheel 3 slips increases, then the traction control unit 57 executes the ignition control or the air-intake control of the engine E to reduce an engine torque, as in the Rev limiter controller 61.

Control Procedure during Starting of Motorcycle

Figure 5:
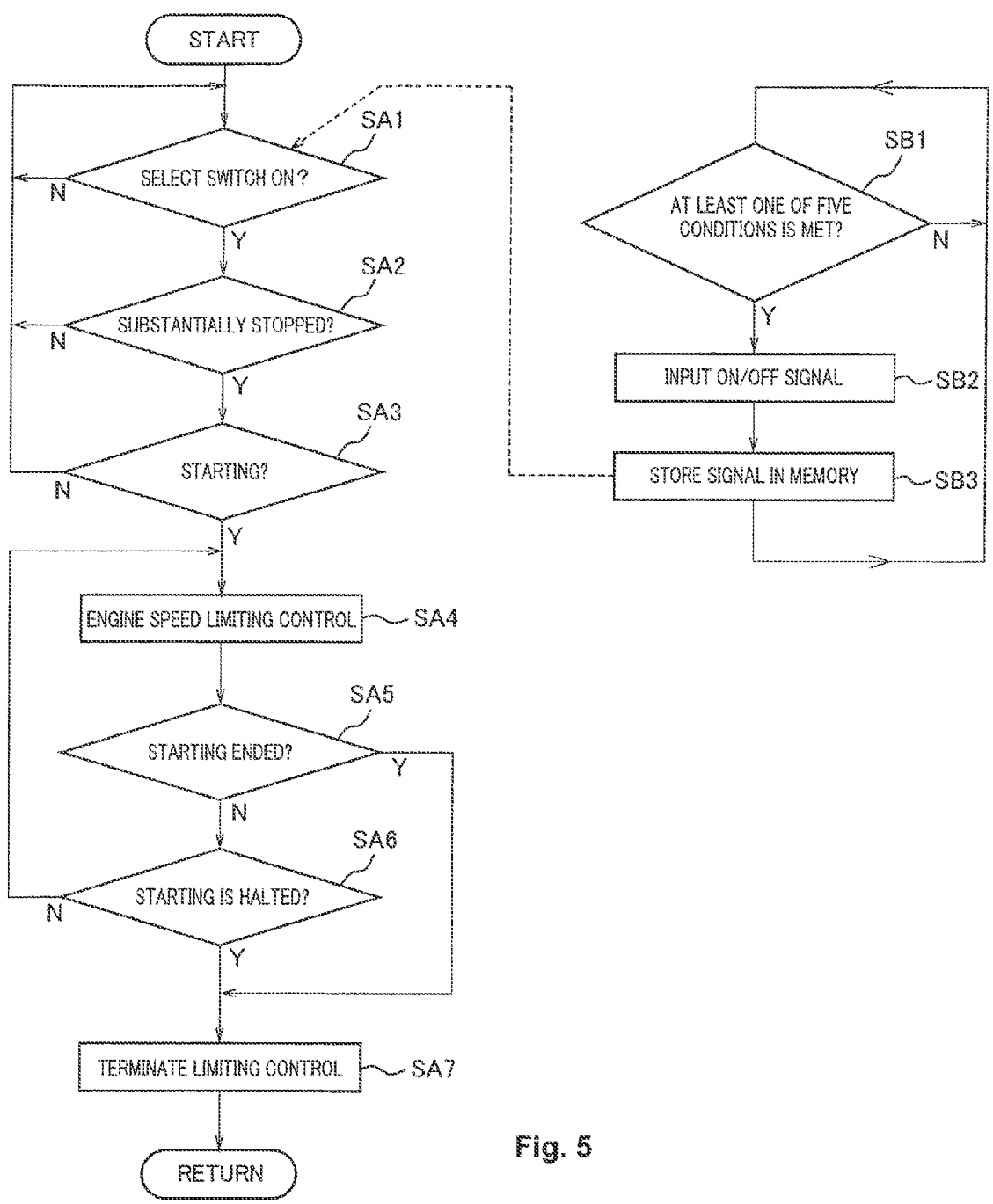
FIG. 5 is a flowchart showing a control procedure performed by the vehicle control system when the motorcycle is starting, and showing at a right side a routine for providing a signal as an input with a select switch.
Figure 6:
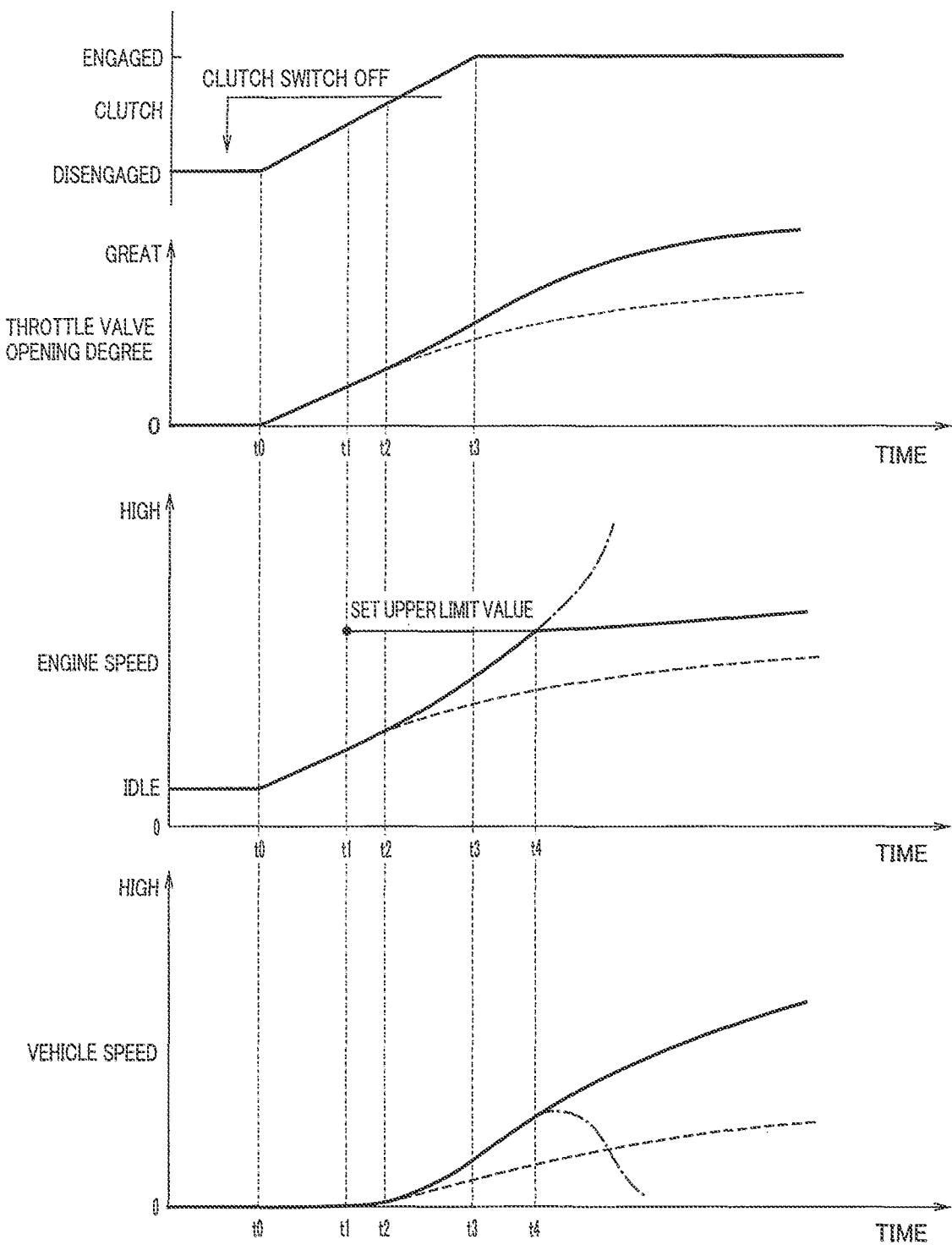
FIG. 6 is a timing chart showing changes in a clutch operation, a throttle valve opening degree, an engine speed, and a vehicle speed, during starting of the motorcycle.

Hereinafter, exemplary control during starting of the motorcycle 1 will be described specifically with reference to FIGS. 5 and 6. FIG. 5 is a flowchart showing a control procedure performed by the vehicle control system 40 when the motorcycle 1 is starting. FIG. 6 is a timing chart showing a change in the clutch operation (engaged/disengaged), a change in the throttle valve opening degree, a change in the engine speed, and a change in the vehicle speed, during starting of the motorcycle 1.

Referring to the left flowchart of FIG. 5, initially, the ECU 17 determines whether or not the select switch 51 is ON, i.e., the engine speed limiting control is permitted (step SA1). Data indicating the ON/OFF state is based on the signal input from the select switch 51 to the engine speed limiting control unit 56. As described above, the signal is accepted by the engine speed limiting control unit 56 in the specified situation in which the behavior of the motorcycle 1 does not change by the execution/non-execution of the engine speed limiting control, and is stored in the memory of the ECU 17.

To be specific, as shown in the right flowchart of FIG. 5, the engine speed limiting control unit 56 determines whether or not the signal is acceptable, based on any one of the following five conditions, which are, for example, i) whether or not the clutch 26 is operated, ii) whether or not the throttle valve opening degree is very small and the throttle valve is in a fully closed position, iii) whether or not the vehicle speed is lower than or equal to a preset threshold and the motorcycle 1 is in a substantially stopped state, iv) the brake pressure is higher than or equal to a preset threshold and the hydraulic brake 53 is actuated, or v) whether or not the gear position set in the transmission 14 is a neutral position (step SB1).

If it is determined that these five conditions are not met (NO in step SB1), the signal from the selected switch 51 is not accepted by the engine speed limiting control unit 56 and is placed in a wait state. On the other hand, if it is determined that any one of these five conditions is met (YES in step SB1), the signal from the select switch 51 is accepted by the engine speed limiting control unit 56 (step SB2), and the data indicating ON/OFF state of the select switch 51 is stored in the memory of the ECU 17 (step SB3).

Turning back to the left flowchart of FIG. 5, in step SA1, the data stored in the memory in the ECU 17 is read to determine whether the select switch 51 is ON or OFF. If it is determined that the select switch 51 is OFF (NO in step SA1), the engine speed limiting control is inhibited by the driver's intention, and therefore the process returns to step SA1. In this case, normal control of the engine E is performed.

On the other hand, if it is determined that the select switch 51 is ON (YES in step SA1), the engine speed limiting control is permitted, and therefore, it is determined whether or not the vehicle speed is lower than or equal to a preset threshold, i.e., the motorcycle 1 is in a stopped state (step SA2). It should be noted that the preset threshold in this determination may be equal to or different from the threshold relating to the determination as to whether or not the motorcycle 1 is in a stopped state in step SB1. If NO in step SA2 and the motorcycle 1 is driving, the process returns to step SA1, whereas if YES in step SA2, and the motorcycle 1 is substantially in a stopped state, then it is determined that the driver has performed an operation to start the motorcycle 1, based on the signal from the clutch switch 50 and the signal from the throttle valve opening degree sensor 45 (step SA3).

To be specific, it is determined whether or not the clutch lever 8 is gripped by the driver based on the signal received from the clutch switch 50, or it is determined whether or not the throttle valve opening degree is greater than or equal to a preset threshold to correspond to the driver's operation for starting the motorcycle 1. If it is determined that any one of the two conditions is not met (NO in step SA3), the process returns to step SA1, whereas if it is determined that the two conditions are met (YES in step SA3), it is determined that the driver is attempting to move the clutch 26 to a half-engaged position and rotate the throttle grip 7 to start the motorcycle 1, because the throttle grip 7 is operated by the driver even though the motorcycle 1 is substantially in a stopped state and the clutch 26 is disengaged.

During the starting, the engine speed limiting control is performed to suppress an increase in the engine speed (step SA4). To be specific, in the engine speed limiting control, the upper limit value of the engine speed, which is about 8000~10000 rpm normally set in the Rev limiter controller 61 as the over speed to protect the engine E, is decreased temporarily to about 3000~5000 rpm, and the engine speed is inhibited from becoming higher than the decreased upper limit value, irrespective of the driver's operation of the throttle grip 7.

For example, in a case where the engine speed is predicted to exceed the decreased upper limit value based on the degree to which the engine speed detected by the engine speed sensor 35 increases, etc., the ignition timing is controlled to be retarded to suppress an increase in the engine torque, the sub-throttle valve 43 is moved toward a closed position, or an increase in the fuel injection amount is suppressed. If the engine speed exceeds the upper limit value even after the above control is executed, a retard amount of the ignition timing is increased or the ignition skip control is executed to reduce the engine torque, based on a magnitude of a deviation between that excess engine speed and the upper limit value.

The engine torque is reduced primarily by the ignition control, because of its high responsiveness. In particular, in the ignition skip control, combustion in some cylinders is paused in their expansion strokes, to allow the engine torque to be decreased quickly and the engine speed to be decreased to the upper limit value quickly as compared to a case where the ignition timing is retarded. The control for merely limiting the engine speed to a value which is less than or equal to the upper limit value is simpler than the feedback-control for causing the engine speed to converge at a predetermined value.

In the present embodiment, the upper limit value of the engine speed is set to a relatively high value to prevent the rear wheel 3 from slipping to a great degree on, for example, the road surface of the dried pavement. This is because, if the upper limit value of the engine speed is set to a small value with which the rear wheel 3 will not slip on a road surface of a gravel road, a muddy road, etc., the engine speed will not substantially increase on the road surface of the dried pavement during starting, or an engine stall will occur if the clutch 26 is operated unskillfully by the driver during starting.

For example, as can be seen from FIG. 7, a table is defined in such a manner that the upper limit value of the engine speed is greater as the vehicle speed of the motorcycle 1 is higher, to provide natural driving feeling to the driver during starting, as described later. More specifically, in the table, the upper limit value is set relatively higher for an engine E in which a rotation inertia of the crankshaft 22 or the like is great and set relatively lower for an engine E in which a rotation inertia of the crankshaft 22 or the like is small, depending on a specification of the engine E. This contributes to prevention of an engine stall.

Furthermore, in the illustrated table, the upper limit value of the engine speed is changed such that a greater value corresponds to a greater pre-load and a smaller value corresponds to a smaller pre-load, according to the magnitude of a static load (pre-load) applied to the motorcycle 1, including passengers and luggage. The magnitude of the pre-load can be detected based on, for example, the signal from a displacement sensor attached on the swing arm 11 supporting the rear wheel 3. Alternatively, characteristics set in this table may be stored in the form of calculation formulas in the ECU 17.

The upper limit value of the engine speed corresponding to the vehicle speed of the motorcycle 1 is read based on the signal from the front wheel speed sensor 36. While suppressing an increase in the engine speed so that the engine speed will not exceed the read upper limit value, it is determined whether or not the motorcycle 1 has shifted from the starting state to the normal driving state (step SA5: STARTING ENDED?). To be specific, it is determined whether or not at least one of the conditions is met, which are i) whether or not the vehicle speed is greater than or equal to a preset threshold and ii) whether or not the transmission gear position is a second gear or higher gear.

If it is determined that these conditions are not met (NO in step SA5), then it is determined whether or not the starting of the motorcycle 1 is halted (step SA6: STARTING IS HALTED?). To be specific, it is determined whether or not at least one of two conditions is met, i.e., i) the engine speed is lower than a preset threshold and ii) whether or not the throttle valve opening degree is less than a preset threshold. If it is determined that these conditions are not met (NO in step SA6), the process returns to step SA4 and the engine speed limiting control continues.

On the other hand, if YES in step SA5 or step SA6, the engine speed limiting control is terminated and the process proceeds to a routine in normal engine control (step SA7). To be specific, the upper limit value of the engine speed in the Rev limiter controller 61 is returned to a value of a normal over speed. The engine E revolves-up linearly over a wide range which is not above the over speed according to the driver's operation of the throttle grip 7.

Change in Engine Speed or the Like During Starting of Motorcycle

Next, the control performed during starting will be described with reference to the flowchart of FIG. 6. This control will be explained in time series. FIG. 6 depicts the engaged/disengaged state of the clutch, a change in the throttle valve opening degree, a change in the engine speed, and a change in the vehicle speed, in this order, from the top to the bottom of the vertical axis.

During starting of the motorcycle 1, initially, the driver grips the clutch lever 8 with a left hand to change the transmission gear position from the neutral position to a first gear position, and then releases the clutch lever 8 gradually. This allows the main clutch 26 in the transmission 14 to be engaged gradually (half-engaged). At the same time, the driver rotates the throttle grip 7 with a right hand to open the main throttle valve 42 (time t0~). In synchronization with this, the air-intake amount in the engine E increases and the engine E increases its engine speed from an idling engine speed.

At this time, the motorcycle 1 is in a stopped state and the vehicle speed is zero. Therefore, it is determined that the motorcycle 1 is starting based on the fact that the clutch lever 8 is gripped by the driver and the throttle valve opening degree is greater than or equal to the set threshold (time t1). The engine speed limiting control is initiated and the upper limit value of the engine speed is set. In response to the driver's operation of the throttle grip 7, the engine E increases its engine speed from the idling engine speed and its driving power is transmitted to the rear wheel 3 gradually via the main clutch 26 in the half-engaged state. As a result, the motorcycle 1 starts to move and the vehicle speed increases gradually (time t2~).

When the engine driving power is transmitted to the rear wheel 3 and the motorcycle 1 starts to move, the vehicle speed starts to change in response to the driver's operation of the throttle grip 7. To be specific, when the throttle valve opening degree is relatively great, the engine speed increases at a higher pace and correspondingly the vehicle speed increases at a higher pace. On the other hand, when the throttle valve opening degree is relatively small, the engine speed increases at a lower pace and correspondingly the vehicle speed increases at a lower pace (time t3).

It should be noted that if the throttle grip 7 is operated to a great amount, the engine torque increases in response to this and the magnitude of the driving power transmitted to the rear wheel 3 increases in excess up to a value beyond a value of the grip force on the road surface, the rear wheel 3 will slip to a great degree and start to spin out. In this state, as indicated by one-dotted dashed line in FIG. 6, the engine speed increases rapidly but increasing of the vehicle speed is impeded (time t4~), which could impart an impact to the driver. If the driver returns the throttle grip 7 rapidly to mitigate the slip, an impact is generated when the grip force of the rear wheel 3 on the road surface is restored. As a result, smooth starting is not implemented.

As a solution to the above, in the present embodiment, as descried above, it is determined whether or not the motorcycle 1 is starting at time t1, and the upper limit value of the engine speed is set. The engine speed which is about to increase rapidly is limited to a value less than or equal to the upper limit value by the ignition control and the throttle control to reduce the engine torque as described above. Because of this, the engine speed is limited to the upper limit value as indicated by a solid line in FIG. 6. As a result, the degree to which the rear wheel 3 slips is suppressed and the vehicle speed increases smoothly and gradually.

The upper limit value increases as the vehicle speed increases, and correspondingly the engine speed limited to the upper limit value increases gradually. In other words, the increase in the engine speed is suppressed by the engine speed limiting control during starting, but the engine speed increases as the vehicle speed increases during a period of time from when the motorcycle 1 starts to move until the vehicle speed reaches to a certain value, which provides a natural driving feeling to the driver. Thereafter, at a time point when the vehicle speed becomes higher or the transmission gear position is upshifted to a second gear or higher gear, the engine speed limiting control is terminated.

When driving on a bad road surface or rough road surface of a gravel road, a muddy road, etc., on which the rear wheel 3 is more likely to slip, the driver frequently operates the throttle grip 7 carefully. For this reason, as indicated by a broken line in FIG. 6, the throttle valve opening degree increases gradually and the engine speed increases gradually after the clutch 26 is engaged. As described above, in the present embodiment, the upper limit value of the engine speed is set to a relatively high value. Therefore, when the driver operates the throttle grip 7 carefully and the engine speed increases gradually, the engine speed is prevented from reaching the upper limit value and the engine torque is prevented from being reduced by the ignition control or the like.

At this time, the engine speed changes in response to the driver's operation of the throttle grip 7, and correspondingly, the behavior of the motorcycle 1 changes. In other words, the driver's operation of the throttle grip 7 is naturally reflected on the running state of the engine E and hence the behavior of the motorcycle 1. On the other hand, in a state where the upper limit value is set relatively higher, initiating of the ignition control, the throttle control, and other control in the engine speed limiting control could be delayed. However, in the present embodiment, the traction control is used along with the engine speed limiting control. Therefore, there is no fear of occurrence of a great slip in the rear wheel 3.

In accordance with the vehicle control system 40 of the present embodiment, during the starting state (first state) of the motorcycle 1, the engine speed limiting control is performed to suppress an increase in the engine speed properly. When the motorcycle 1 has shifted from the starting state to the normal driving state (second state), the engine speed limiting control is terminated. That is, it is possible to suppress the engine speed from increasing in excess as desired, depending on the driving state of the motorcycle 1. As a result, smooth driving is implemented.

In addition, in the engine speed limiting control, merely limiting of the engine speed to a value less than or equal to the upper limit value is performed. In an engine speed range which is lower than the upper limit value, the engine speed changes and the behavior of the motorcycle 1 changes in response to the driver's operation of the throttle grip 7. Therefore, the driver does not feel discomfort.

The control for merely limiting the engine speed to a value less than or equal to the upper limit value is accomplished in a simple way. In the present embodiment, the engine speed limiting control is performed by using the general over Rev limiter, which makes the control simplified.

Furthermore, in the present embodiment, the engine speed limiting control can be inhibited by operating the select switch 51 according to the driver's intention. In that case, the signal from the select switch 51 is accepted by the engine speed limiting control unit 56 only during the stopped state of the motorcycle 1, etc., and the control is not switched during driving. Therefore, safety is easily ensured.

Other Embodiment

The above described embodiments are merely exemplary, and are in no way intended to limit the present invention, its applications and its uses. For example, although it is determined whether or not the motorcycle 1 is starting, based on both of the operation of the clutch lever 8 and the operation of the throttle grip 7 in the substantially stopped state of the motorcycle 1, it may be done based on either one of the operation of the clutch lever 8 and the operation of the throttle grip 7.

Although the vehicle speed is calculated based on the signal from the front wheel speed sensor 36 to detect the stopped state of the motorcycle 1, etc., the vehicle speed may be detected based on, for example, the signal from the rear wheel speed sensor 34, the rotational speed of the output shaft 28 of the transmission 14, etc., or may be detected using a well-known GPS.

Instead of detecting the throttle valve opening degree as the amount of the accelerator operated by the driver, the operation amount may be detected based on the signal from a sensor attached on the throttle grip 7.

Alternatively, it may be determined that the motorcycle 1 is starting, from the fact that the driver has operated the clutch lever 8 and/or the throttle grip 7 after the driver performed an operation for stopping the motorcycle 1, instead of that fact that the motorcycle 1 is in the stopped state. In that case, it may be determined that the driver performed the operation for stopping the motorcycle 1, based on at least one of the fact that the vehicle speed is lower than or equal to a set threshold, the fact that the throttle valve opening degree is less than or equal to a set threshold, and the fact that the brake pressure detected by the brake pressure sensor 55 is higher than or equal to a set threshold.

In a further alternative, the engine speed limiting control may be performed to prevent the rear wheel 3 from slipping to a great degree during acceleration in a lower transmission gear position (first gear position or second gear position) at which the rear wheel 3 is more likely to slip, instead of during starting of the motorcycle 1. In that case, the engine speed limiting control may be initiated, for example, when the clutch lever 8 is operated and the throttle valve opening degree is greater than or equal to a threshold, in light of the fact that the rear wheel 3 is more likely to slip to a great degree when accelerated driving is initiated after the gear position in the transmission 14 is changed.

Although in the above embodiments, the engine speed limiting control is terminated when the motorcycle 1 has shifted from the starting state to the normal driving state and starting of the motorcycle 1 is halted for some reason or other, the control may be terminated, when the motorcycle 1 shifts from the starting state to the normal driving state, or starting of the motorcycle 1 is halted. Alternatively, the engine speed limiting control may be terminated when a specified time lapses after starting of the motorcycle 1 is initiated.

Figure 7:
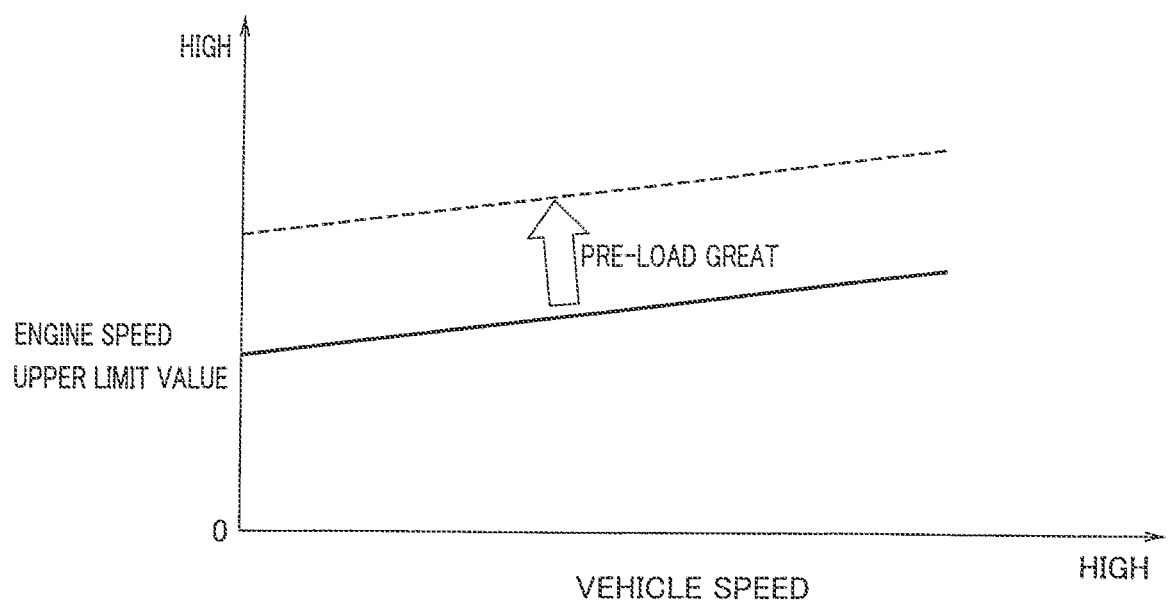
FIG. 7 is a view showing an exemplary table in which an upper limit value of the engine speed in engine speed limiting control in correspondence with the vehicle speed.

Although in the above embodiments, the upper limit value of the engine speed in the engine speed limiting control is set to increase as the vehicle speed increases as shown in FIG. 7, the upper limit value may be set to a constant value. Although in the above embodiments, the engine speed limiting control and the traction control are used together, the present invention is not limited to this.

Although in the above embodiments, the motorcycle 1 including the engine E as the driving power source has been described, the driving power source may be an electric motor, etc., instead of the engine. Moreover, the vehicle is not limited to the motorcycle 1 but may be, for example, an ATV (all terrain vehicle), small truck, or other vehicle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A control system for controlling a driving power source in a vehicle, comprising:
    a driving state detector for detecting a driving state of the vehicle;
    a first determiner for determining whether or not the driving state detected by the driving state detector is a starting state;
    a second determiner for determining whether or not the driving state detected by the driving state detector is a normal driving state to which the vehicle has shifted from the starting state;
    a rotational speed limiter for executing rotational speed limiting control for limiting a rotational speed of the driving power source to a value which is less than or equal to a predetermined upper limit value when the first determiner determines that the driving state is the starting state, during an operation of the driving power source; and
    a rotational speed limiting termination unit for terminating the rotational speed limiting control, when the second determiner determines that the driving state is the normal driving state, during the operation of the driving power source.

2. The control system according to claim 1,
    wherein the driving state detector includes an accelerator operation amount sensor for detecting an amount of operation of an accelerator performed by a driver and a clutch operation sensor for detecting an operation of a clutch performed by the driver; and
    the starting state includes a state where a condition in which the amount of operation of the accelerator detected by the accelerator operation amount sensor is greater than or equal to a set threshold, and a condition in which the operation of the clutch is detected by the clutch operation sensor, are met.

3. The control system according to claim 1,
    wherein the driving state detector further includes a driving power source rotational speed sensor for detecting the rotational speed of the driving power source, an accelerator operation amount sensor for detecting an amount of operation of an accelerator performed by a driver, and a vehicle speed sensor for detecting a vehicle speed;
    the normal driving state includes a state where at least one of a condition in which the rotational speed of the driving power source detected by the driving power source rotational speed sensor has decreased from a value which is greater than or equal to a set threshold to a value less than the set threshold, a condition in which the amount of operation of the accelerator detected by the accelerator operation amount sensor has decreased from a value which is greater than or equal to a set threshold to a value less than the set threshold, a condition in which the vehicle speed detected by the vehicle speed sensor is greater than or equal to a set threshold, and a gear position in a transmission is higher than or equal to a set gear position, is met.

4. The control system according to claim 1, further comprising:
    a select switch which is turned ON or OFF to permit or inhibit execution of the rotational speed limiting control;
    wherein a signal from the select switch is accepted by the rotational speed limiter when at least one of a plurality of conditions is met, the conditions being a condition in which a clutch is operated by a driver, a condition in which an amount of an operation of an accelerator performed by the driver is less than or equal to a predetermined value and the accelerator is in a substantially fully closed position, a condition in which a vehicle speed is less than or equal to a predetermined value and the vehicle is in a stopped state, a condition in which a brake pressure is higher than or equal to predetermined value and a brake is actuated, and a condition in which a gear position in a transmission is a neutral position.

5. The control system according to claim 1, further comprising:
    an over Rev limiter for limiting the rotational speed of the driving power source to a value which is less than or equal to a value of an over speed during an operation of the driving power source to protect the driving power source;
    wherein the upper limit value in the rotational speed limiting control is set to a value lower than the value of the over speed.

6. A control system for controlling a driving power source in a vehicle, comprising:
    a driving state detector for detecting a driving state of the vehicle;
    a first determiner for determining whether or not the driving state detected by the driving state detector is a starting state;
    a second determiner for determining whether or not the driving state detected by the driving state detector is a normal driving state to which the vehicle has shifted from the starting state;
    a rotational speed limiter for executing rotational speed limiting control for limiting a rotational speed of the driving power source to a value which is less than or equal to a predetermined upper limit value when the first determiner determines that the driving state is the starting state, during an operation of the driving power source; and a rotational speed limiting termination unit for terminating the rotational speed limiting control, when the second determiner determines that the driving state is the normal driving state, during the operation of the driving power source;

wherein the starting state includes a state where a first condition in which the vehicle is in a stopped state or a driver has performed an operation for stopping the vehicle, is met.

7. The control system according to claim 6, wherein the driving state detector includes at least one of a vehicle speed sensor for detecting a vehicle speed, an accelerator operation amount sensor for detecting an amount of operation of an accelerator performed by the driver, and a brake pressure sensor for detecting a brake pressure; and the first condition includes at least one of a condition in which the vehicle speed detected by the vehicle speed sensor is less than or equal to a set threshold, a condition in which the amount of operation of the accelerator detected by the accelerator operation amount sensor is less than or equal to a set threshold, and a condition in which the brake pressure detected by the brake pressure sensor is greater than or equal to a set threshold.

8. The control system according to claim 7, wherein the starting state further includes a state where a second condition in which the driver has performed an operation for starting or accelerating the vehicle is met after the first condition is met.

9. The control system according to claim 8, wherein the driving state detector further includes a clutch operation sensor for detecting an operation of a clutch performed by the driver; and the second condition includes at least one of a condition in which the amount of operation of the accelerator detected by the accelerator operation amount sensor is greater than or equal to a set threshold, and a condition in which the operation of the clutch is detected by the clutch operation sensor.

10. A control system for controlling a driving power source in a vehicle, comprising:

a driving state detector for detecting a driving state of the vehicle;

a first determiner for determining whether or not the driving state detected by the driving state detector is a starting state;

a second determiner for determining whether or not the driving state detected by the driving state detector is a normal driving state to which the vehicle has shifted from the starting state;

a rotational speed limiter for executing rotational speed limiting control for limiting a rotational speed of the driving power source to a value which is less than or equal to a predetermined upper limit value when the first determiner determines that the driving state is the starting state, during an operation of the driving power source; and a rotational speed limiting termination unit for terminating the rotational speed limiting control, when the second determiner determines that the driving state is the normal driving state, during the operation of the driving power source;

wherein the rotational speed limiter reduces a torque of the driving power source according to a magnitude of a rotational speed deviation with respect to the upper limit value when the rotational speed of the driving power source exceeds the upper limit value.

11. A control system for controlling a driving power source in a vehicle, comprising:

a driving state detector for detecting a driving state of the vehicle;

a first determiner for determining whether or not the driving state detected by the driving state detector is a starting state;

a second determiner for determining whether or not the driving state detected by the driving state detector is a normal driving state to which the vehicle has shifted from the starting state;

a rotational speed limiter for executing rotational speed limiting control for limiting a rotational speed of the driving power source to a value which is less than or equal to a predetermined upper limit value when the first determiner determines that the driving state is the starting state, during an operation of the driving power source; and a rotational speed limiting termination unit for terminating the rotational speed limiting control, when the second determiner determines that the driving state is the normal driving state, during the operation of the driving power source;

wherein the upper limit value of the rotational speed of the driving power source in the rotational speed limiting control is set to increase according to a vehicle speed.

12. A control system for controlling a driving power source in a vehicle, comprising:

a driving state detector for detecting a driving state of the vehicle;

a first determiner for determining whether or not the driving state detected by the driving state detector is a starting state;

a second determiner for determining whether or not the driving state detected by the driving state detector is a normal driving state to which the vehicle has shifted from the starting state;

a rotational speed limiter for executing rotational speed limiting control for limiting a rotational speed of the driving power source to a value which is less than or equal to a predetermined upper limit value when the first determiner determines that the driving state is the starting state, during an operation of the driving power source; and a rotational speed limiting termination unit for terminating the rotational speed limiting control, when the second determiner determines that the driving state is the normal driving state, during the operation of the driving power source; and a torque controller for controlling a torque of the driving power source according to at least one of a slip state of a drive wheel and a change state of the rotational speed of the driving power source.

* * * * *